(12) United States Patent
Want et al.

(10) Patent No.: US 10,635,460 B2
(45) Date of Patent: Apr. 28, 2020

(54) ASSISTED INTERACTION FOR MOBILE PRODUCTS

(71) Applicant: Google Inc., Mountain View, CA (US)

(72) Inventors: Roy Want, Los Altos, CA (US); William Schilit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 311 days.

(21) Appl. No.: 14/977,360

(22) Filed: Dec. 21, 2015

(65) Prior Publication Data

US 2018/0336044 A1 Nov. 22, 2018

(51) Int. Cl.
*G06F 3/048* (2013.01)
*G06F 9/451* (2018.01)
*H04W 4/80* (2018.01)
*H04L 29/08* (2006.01)
*H04M 1/725* (2006.01)

(52) U.S. Cl.
CPC ............ *G06F 9/453* (2018.02); *H04W 4/80* (2018.02); *H04L 67/1095* (2013.01); *H04L 67/141* (2013.01); *H04M 1/7253* (2013.01); *H04M 2250/56* (2013.01)

(58) Field of Classification Search
CPC .... G06F 9/4446; G06F 3/04847; G06F 3/048; H04W 4/008; H04L 67/10
See application file for complete search history.

(56) References Cited

U.S. PATENT DOCUMENTS

| | | | | |
|---|---|---|---|---|
| 8,307,283 B1* | 11/2012 | O'Neill | ............. | G09B 19/0053 715/705 |
| 8,905,763 B1* | 12/2014 | Hu | ......... | G09B 19/00 434/365 |
| 9,292,082 B1* | 3/2016 | Patel | ..................... | G02B 27/017 |
| 9,760,174 B1* | 9/2017 | Letendre | ................ | G06F 3/016 |
| 2011/0301956 A1* | 12/2011 | Sano | ........................ | G06F 3/012 704/270 |
| 2012/0023077 A1* | 1/2012 | Kann | ................. | G06F 17/30581 707/702 |
| 2014/0149255 A1* | 5/2014 | Bouma | .............. | G06Q 30/0623 705/26.61 |
| 2015/0301726 A1* | 10/2015 | Mattiuzzo | ............... | G06F 3/041 345/173 |
| 2015/0355715 A1* | 12/2015 | Smith | ..................... | G06F 3/017 715/863 |
| 2016/0165651 A1* | 6/2016 | Pathuri | .............. | H04W 76/021 370/329 |
| 2016/0216876 A1* | 7/2016 | Lee | ..................... | G06F 3/04842 |
| 2016/0301794 A1* | 10/2016 | Schlakman | ............ | G06Q 10/06 |

* cited by examiner

*Primary Examiner* — Jeanette J Parker
(74) *Attorney, Agent, or Firm* — Foley & Lardner LLP

(57) ABSTRACT

Systems and methods using one or more processors of a user electronic device for receiving user interactions and sending data related to those user interactions to another device. This may include receiving input comprising an interaction with the user device, identifying an application installed on the user device to which the interaction is directed to, and sending data over a network comprising an indication of a model of the user device, an identifier of the application, and an indication of the interaction. Sending the data may initiate one of a video playback, a tutorial, a demonstration, or a simulation, based on the data, on a device different than the user device. In some arrangements, the interaction is directed to a process running on the user device instead of an application.

18 Claims, 6 Drawing Sheets

ASSISTED INTERACTION FOR MOBILE PRODUCTS

BACKGROUND

User electronic devices, including such personal devices as mobile telephones, are often displayed in retail locations in a way that allows customers to interact with the user electronic devices. This allows customers to interact with the devices and try out various features as well as installed applications. Customers often are able to compare and contrast different devices or different models of the same device through this physical interaction with the electronic devices in one location.

SUMMARY

One implementation relates to a method running on one or more processors of a user electronic device for receiving user interactions and sending data related to those user interactions to another device. The method may include receiving input comprising an interaction with the user device, identifying an application installed on the user device to which the interaction is directed to, and sending data over a network comprising an indication of a model of the user device, an identifier of the application, and an indication of the interaction. Sending the data may initiate one of a video playback, a tutorial, a demonstration, or a simulation, based on the data, on a device different than the user device. In some arrangements, the interaction is directed to a process running on the user device instead of an application. The implementation may further comprise receiving a response from the application or running process consequent to the first interaction, receiving a second input comprising a second user interaction with the application or running process and sending additional data over the network comprising the identifier of the application or running process, an indication of the response from the application or running process and, an indication of the second user interaction.

Another implementation relates to a method running on one or more processors of a demonstration system receiving interaction data with a user electronic device. The method may include receiving data over a network comprising an identifier of a model of a user device, an identifier of an application on the user device, and an indication of an interaction with the application and launching one of a video playback, a tutorial, a demonstration, and a simulation responsive to receiving the data. The method may further comprise receiving additional data over the network comprising an identifier of the application, an indication of a response from the application, and an indication of another interaction with the application after the response from the application.

Another implementation relates to a system for receiving user interactions and sending data related to those user interactions to another device. The system may include a transparent overlay service running on an electronic user device configured to run several operations. The operations may include receiving input comprising an interaction with the user device, identifying an application installed on the user device to which the interaction is directed to; and sending data over a first network connection comprising an indicator of a model of the user device, an identifier of the application, and an indication of the interaction. The system may further comprise an auxiliary interaction device that has one or more processors, a second network connection and one or more displays. Receiving the data over the second network connection may cause the auxiliary interaction device to initiate a video playback, a tutorial, a demonstration, or a simulation presented on the display, the selection of which may be based on the model of the user device. In some arrangements, the interaction is directed to a process running on the user device instead of an application. In some arrangements, the system may further comprise operations from the transparent overlay service for receiving a response from the application consequent to the interaction, receiving a second input comprising a second interaction directed to the application and, sending second data over the network comprising the identifier of the application and an indication of the second interaction Receiving the second data over the second network connection causes the auxiliary interaction device to alter the display of the video playback, tutorial, demonstration, or simulation.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

In some instances, electronic user devices are available and displayed for retail sale in stores. The electronic user devices may be available to customers for trial use. Occasionally, such electronic user devices may in a locked down mode using a demonstration application, but this does not provide an actual user experience with the electronic user devices. If electronic user devices are left open with all processes, installed software, and installed applications available, any user interacting with the devices can see previous interactions, may have their experience start with a program or application already running and may see data entered or recorded by previous users. In addition, simply interacting with the devices may be frustrating and nonproductive without instruction or demonstration of the features.

Accordingly, it may be useful to have a transparent overlay service running on the electronic user devices that does not change the user experience but sends the user interactions to an auxiliary system that can use one or more displays to show videos, tutorials, demonstrations, and simulations of the programs, processes, or applications the user is interacting with on the electronic user device.

For purposes of reading the description of the various embodiments below, the following descriptions of the sections of the specification and their respective contents may be helpful:

Section A describes an auxiliary system for demonstrating personal devices using an assisted interaction computing environment which may be useful for practicing embodiments described herein;

Section B describes embodiments of methods for using an auxiliary system for assisted interaction with personal devices; and Section C describes a network environment and computing environment which may be useful for practicing embodiments described herein.

A. Assisted Interaction Computing Environment

Figure 1A:
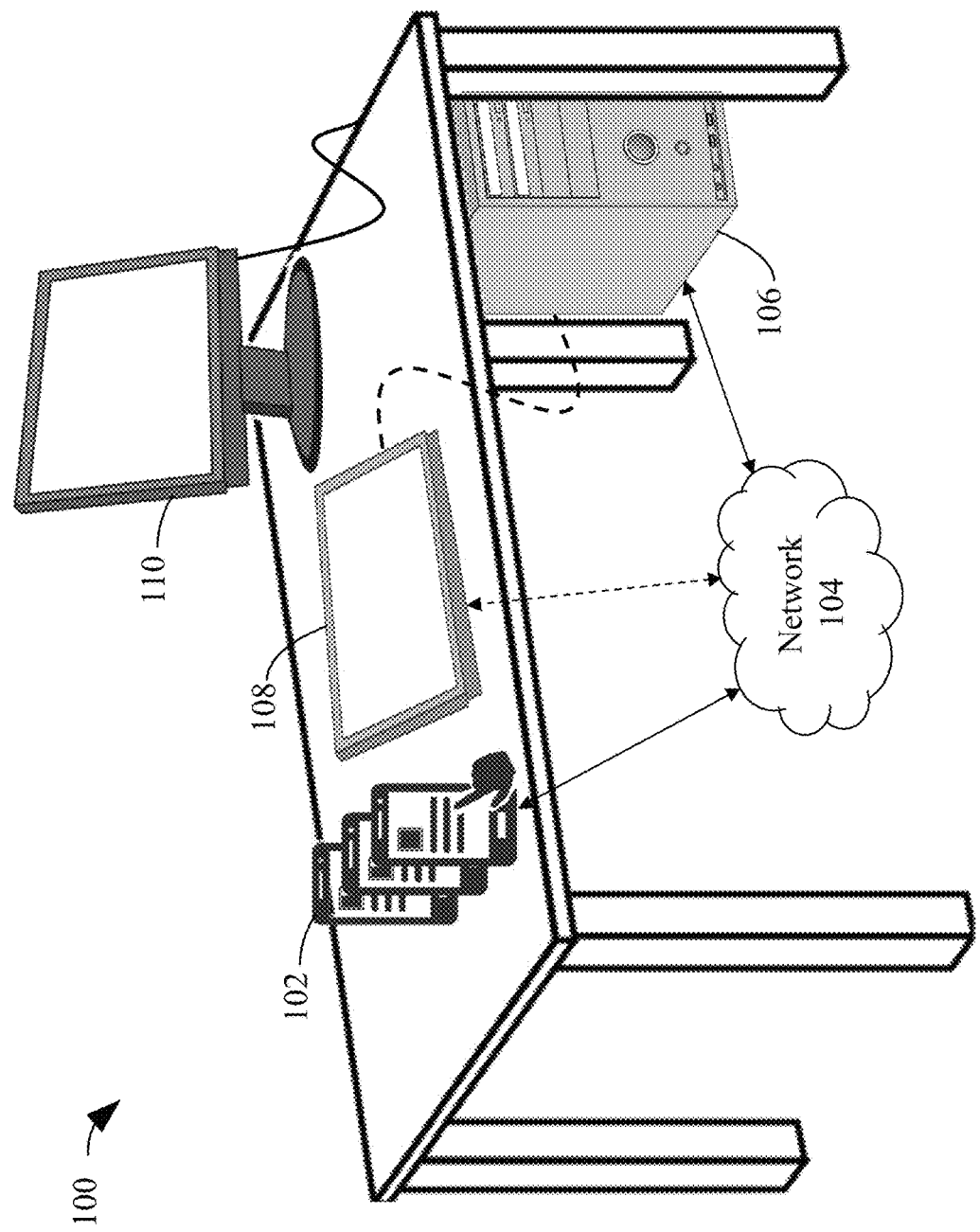
FIG. 1A is a block diagram depicting an embodiment of an environment for providing assisted interaction with electronic user devices.
Figure 1B:
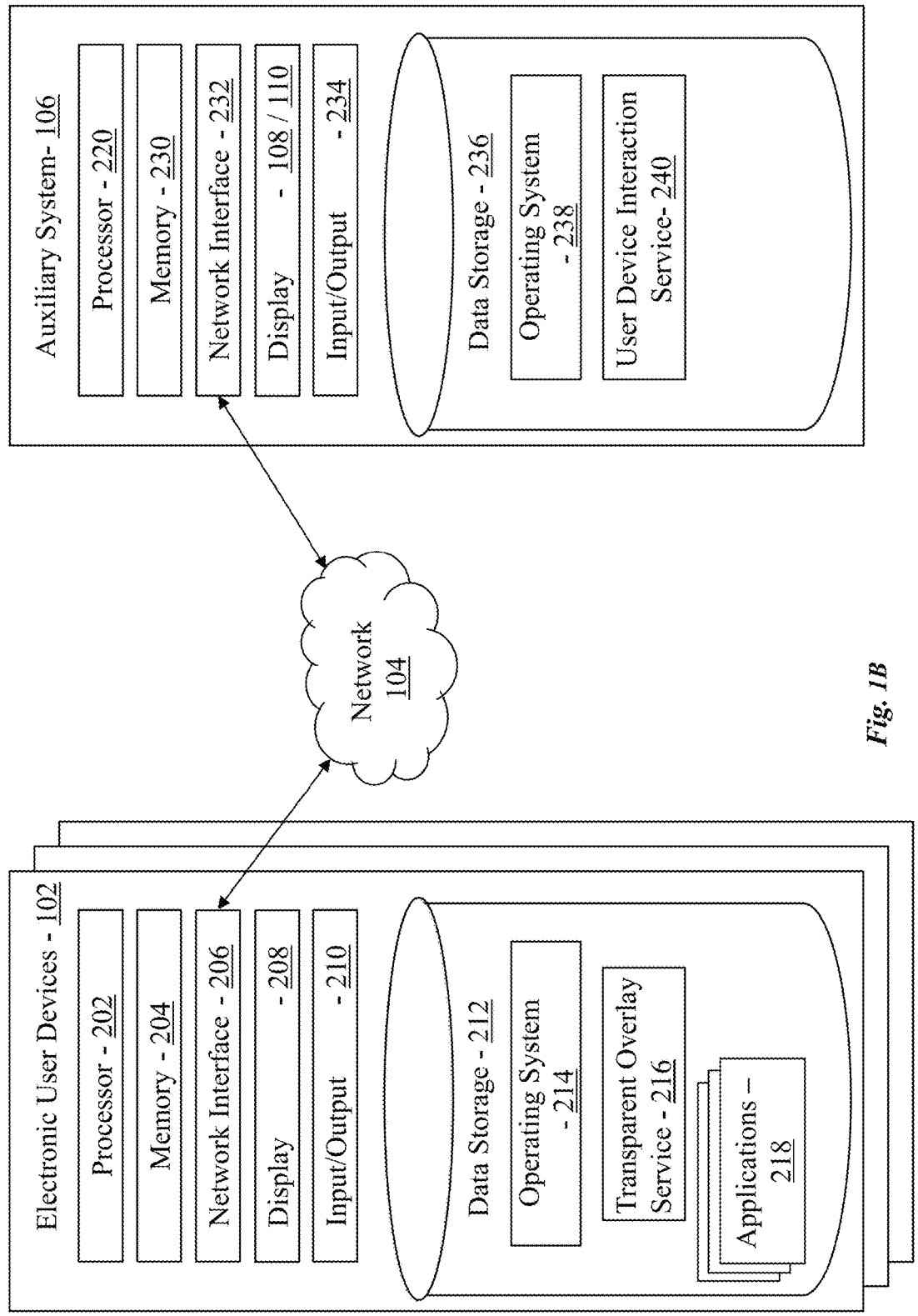
FIG. 1B is a block diagram depicting an embodiment of a system for providing assisted interaction with electronic user devices.

Prior to discussing the specifics of embodiments of the systems and methods of using an auxiliary system for assisted interaction with personal devices, it may be helpful to discuss an embodiment of an assisted interaction computing environment where such systems and methods may be deployed. FIG. 1A, depicts a high level embodiment of an assisted interaction computing environment 100 is depicted. In brief overview, the environment comprises electronic user devices 102 communicating over a network 104 to an auxiliary system 106 for assisted interaction. FIG. 1B, depicts a more detailed view of the components of the electronic user devices 102 and the auxiliary system 106.

Referring now to FIG. 1A, an embodiment of an environment 100 having electronic user devices 102 communicating over a network 104 to an auxiliary system 106 for assisted interaction is depicted. The electronic user devices 102 may be any number of different types of personal and mobile devices configured to communicate via the network 104 (e.g., a laptop computer, a tablet computer, a smartphone, a digital video recorder, a set-top box for a television, a video game console, combinations thereof, etc.).

The network 104 may be any form of computer network that relays information between the client device 102 and the auxiliary system 106. In some embodiments, the network 104 is a wireless local network such as a Bluetooth transceiver, a Bluetooth beacon, an RFID transceiver, Near Field Communication (NFC) transmitter or other similar technologies known in the art. The local network. In other arrangements, the network 104 may include the Internet and/or other types of data networks, such as a local area network (LAN), a wide area network (WAN), a cellular network, satellite network, or other types of data networks. The network 102 may also include any number of additional computing devices (e.g., computer, servers, routers, network switches, smartphones, tablets, mobile phones, etc.) that are configured to receive and/or transmit data within the network 102. The network 102 may further include any number of hardwired and/or wireless connections. For example, the user electronic device 102 may communicate wirelessly (e.g., via WiFi, cellular, radio, etc.) with a transceiver that is hardwired (e.g., via a fiber optic cable, a CAT5 cable, etc.) to other computing devices, such as the auxiliary system 106 in the network 102. In some arrangements, reliable communication methods are used over the network with acknowledgment and resend if there is no acknowledgment received.

The auxiliary system 106 may be any number of different types of computing devices configured to communicate via the network 104 (e.g., a laptop computer, a tablet computer, a desktop computer, an embedded computer, etc.)

The display 108 may be an external display, such as a computer monitor, television set, or any other stand-alone form of electronic display. In some arrangements, the display 108 also incorporates other audio/visual equipment such as speakers, microphones, etc. The display may allow direct interaction via an incorporated touchscreen device. In some alternate arrangements, the display 108 may be integrated into the housing of a laptop computer, mobile device, smartphone, tablet, or other form of computing device having an integrated display and the display 108 and auxiliary system 106 are integrated into one unit (e.g. a tablet computer).

The display 110 may be an external display, such as a computer monitor, television set, or any other stand-alone form of electronic display. In some arrangements, the display 110 also incorporates other audio/visual equipment such as speakers, microphones, etc. The display may allow direct interaction via an incorporated touchscreen device.

Referring now to FIG. 1B, a block diagram 200 of a system for providing assisted interaction with electronic user devices 102 is depicted according to an example embodiment. The user electronic device 102 is shown to include a processor 202 and a memory 204. The memory 204 may store machine instructions that, when executed by the processor 202, cause the processor 202 to perform one or more of the operations described herein. The processor 202 may include one or more microprocessors, application specific integrated circuits (ASICs), field programmable gate arrays (FPGAs), other forms of processing circuits, or combinations thereof. The memory 204 may include, but is not limited to, electronic, optical, magnetic, or any other storage or transmission device capable of providing the processor 202 with program instructions. The memory 204 may include storage devices such as a floppy disk, CD-ROM, DVD, magnetic disk, memory chip, ROM, RAM, EEPROM, EPROM, flash memory, optical media, or any other suitable memory from which the processor 202 can read instructions. The processor 202 and the memory 204 may form a processing module.

The electronic user device 102 is shown to include a network interface 206. In some arrangements, the network interface 206 includes the hardware and logic necessary to communicate over multiple channels of data communication. For example, the network interface 206 may include a cellular modem, a Bluetooth transceiver, a Bluetooth beacon, an RFID transceiver, and/or an NFC transmitter. Data passing through the network interface 206 may be encrypted such that the network interface 206 is a secure communication module.

The electronic user device 102 includes a display 208 and input/output 210. In some arrangements, the display 208 and the user input 210 are combined in the form of a touchscreen device. The display may be any electronic device that conveys data to a user by generating sensory information (e.g., a visualization, sounds, etc.). The input/output 210 may be any electronic device that converts received information from a user into electronic signals (e.g., a keyboard, a mouse, a pointing device, a touch screen display, a microphone, etc.). The one or more displays 208 and input/output 210 devices may be internal to the housing of the electronic user device 102 (e.g., a built-in display, microphone, etc.) or external to the housing of the electronic user device 102 (e.g., a monitor connected to the electronic user device 102, a speaker connected to the electronic user device 102, etc.), according to various implementations. The input/output 210 may be any of various sensors embedded or connected to the electronic user device 102 (including biometric sensors, gyroscopic sensors, motion sensors including accelerometers, environmental sensors such as temperature, gravity, light, pressure and magnetic field sensors, position sensors, accelerometers, etc.) For example, the electronic user device 102 may include an electronic display 208, which may display webpages, user interfaces for applications, and/or other displays. In various implementations, the display 208 may be located inside or outside of the same housing as that of the processor 202 and/or the memory 204. For example, the display 208 may be an external display, such as a computer monitor, television set, or any other stand-alone form of electronic display. In other examples, the display 208 may be integrated into the housing of a laptop computer, mobile device, smartphone, tablet, or other form of computing device having an integrated display.

The electronic user device 102 may also include data storage 212. The data storage 212 may include files stored in non-volatile memory including files needed to run an operating system 214, transparent overlay service 216, and various applications 218 on the electronic user device 102.

The data storage 221 may store the files necessary to run an operating system 214. In some arrangements, the operating system 214 is a release of an Android operating system. In other arrangements, the operating system 214 is a release of other operating systems (iOS, Windows Phone (Windows Mobile), Blackberry 10, Firefox OS, Sailfish OS, Tizen, Ubuntu Touch OS, etc.).

The data storage 221 may store the files necessary to run the transparent overlay service 216. The transparent overlay service 214 when running may act as an intermediary between user input and output and applications, process, or other software running on the electronic user device 102. In arrangements, where the operating system 214 is a release of an Android operating system, the transparent overlay service 214 may run as the top-most task. In some arrangements, the transparent overlay service 214 can monitor all activities and tasks running on the electronic user device and which tasks are in the foreground or which activity has focus. In some arrangements, the transparent overlay service 214 uses various API classes (e.g., in Android OS) to retrieve information about the available memory, retrieve information on any processes that are in an error condition, retrieve information about tasks that have been most recently started or visited, retrieve information about a running process, retrieve information about a particular service that is currently running in the system, retrieve information about a particular task that is currently running in the system, retrieve information about current activity in the recent task list, and the like. In other arrangements, the transparent overlay service 214 runs as a service in the background. In other arrangements, the transparent overlay service 214 runs as a privileged application with access to most or all parts of the operating system and other applications. In some arrangements, the accessibility interface of the Android OS may be utilized. For example, descriptive text added to user interface controls may be accessed and sent as part of user interaction information to the auxiliary system 106 over the network 104. In another example, accessibility event objects may be sent as part of the user interaction information to the auxiliary system 106 whenever the content of a custom view changes. Other information available due to the accessibility interface may be utilized to help determine user interactions.

The electronic user device 102 may also include applications 218. For example, the applications 218 may be web browsers, communications applications (e.g., email applications, instant messenger applications, etc.), productivity applications (e.g., text editors, software development applications, spreadsheet applications, etc.), social media applications, multimedia players (e.g., music players, movie players, etc.), games, navigation applications, or any other form of application.

The electronic user device 102 is shown to include a network interface 206. In some arrangements, the network interface 206 includes the hardware and logic necessary to communicate over multiple channels of data communication. For example, the network interface 206 may include a cellular modem, a Bluetooth transceiver, a Bluetooth beacon, an RFID transceiver, and/or an NFC transmitter. Data passing through the network interface 206 may be encrypted such that the network interface 206 is a secure communication module.

The embodiment of the auxiliary system 106 includes a display 108, a display 110 and input/output 234. In some arrangements, the display 108 or 110 and the user input 234 are combined in the form of a touchscreen device. The display may be any electronic device that conveys data to a user by generating sensory information (e.g., a visualization, sounds, etc.). The input/output 234 may be any electronic device that converts received information from a user into electronic signals (e.g., a keyboard, a mouse, a pointing device, a touch screen display, a microphone, etc.). The one or more displays 108, 110 and/or input/output 234 devices may be internal to the housing of the auxiliary system 106 (e.g., as part of a tablet computer) or external to the housing of the auxiliary system 106 (e.g., a monitor 110 connected to the auxiliary system 106, a speaker connected to the auxiliary system 106, etc.), according to various implementations.

The auxiliary system 106 may also include data storage 236. The data storage 236 may include files stored in non-volatile memory including files needed to run an operating system 238 and a user device interaction service 240.

The data storage 236 may store the files necessary to run an operating system 238. In some arrangements, the operating system 214 is a release of an Android operating system. In other arrangements, the operating system 214 is a release of other operating systems (Google Chrome OS, OSX, iOS, Windows, Windows Phone (Windows Mobile), Blackberry 10, Firefox OS, Sailfish OS, Tizen, Ubuntu, Ubuntu Touch OS, other Linux distributions, etc.).

The data storage 221 may store the files necessary to run the user device interaction service 240. The user device interaction service 240 may act upon received electronic user device 102 information as well as received user interaction information with an electronic user device 102. In some arrangements, the user device interaction service 240 contains a database mapping received electronic user device 102 model information, application or running process identifier information, and/or user interaction information to a stored video, demonstration, tutorial, or simulation. In other arrangements, the user device interaction service may perform a contextual search based on the received information to locate a relevant video, demonstration, tutorial or simulation. In other arrangements, the user device interaction service 240 is able to detect when the user of a personal device 102 is having difficulty interacting with the personal device. Detection may occur through repetitive actions (e.g., repeatedly closing and opening an application, repeatedly backing out of and reentering the same functions in applications, etc.), excessive pauses or delays on certain screens of the user interface or on certain screens of applications, and the like.

B. Methods for Using an Auxiliary System for Assisted Interaction

Figure 2:
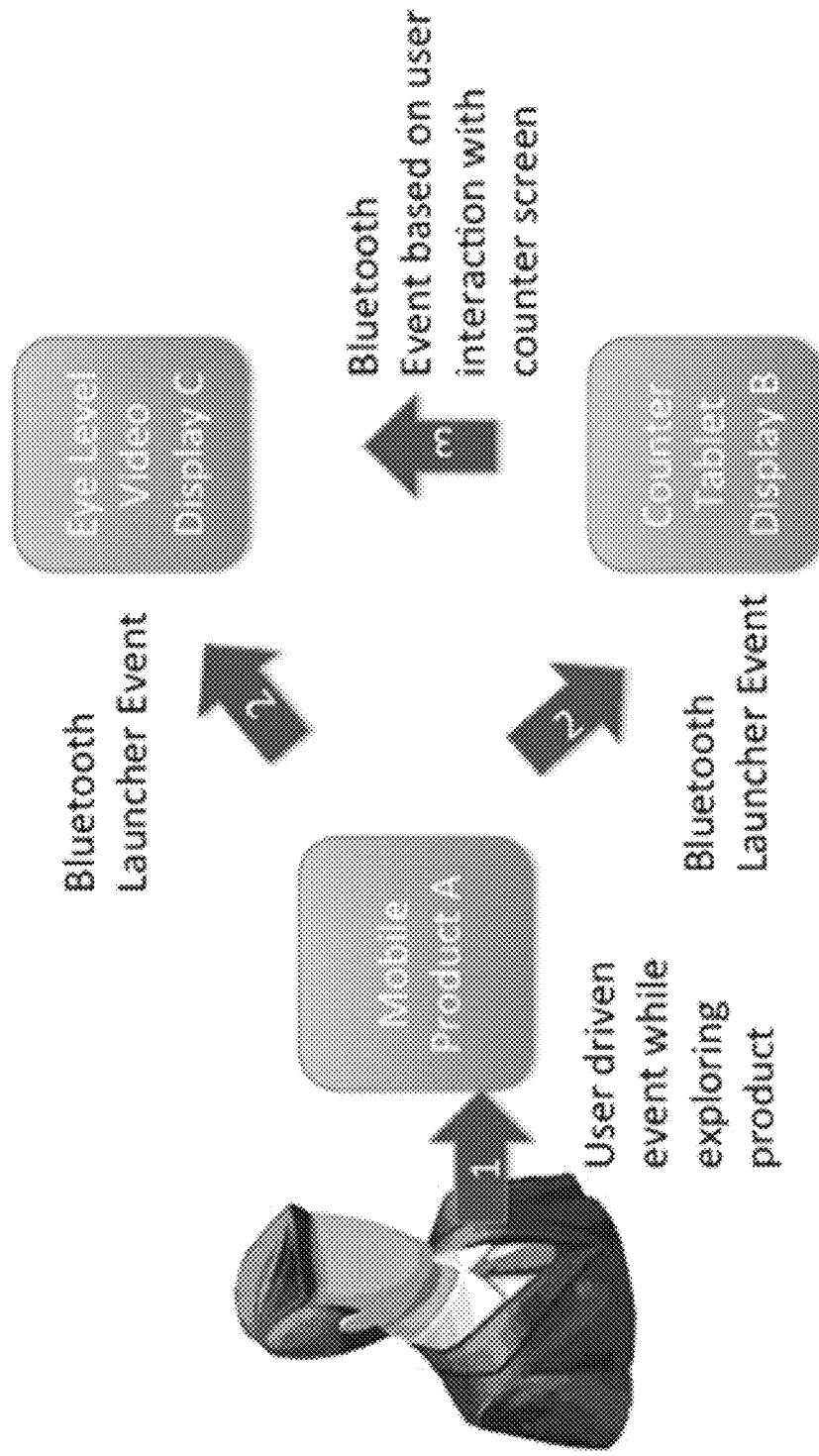
FIG. 2 is a flow chart depicting an embodiment of a flow of events at a high level between an electronic user device and a supporting information display.

Referring now to FIG. 2, a flow chart 300 of a flow of events at a high level between an electronic user device 102 and an auxiliary system 106 used as a supporting information display is depicted according to an example embodiment. In some arrangements, the electronic user device 102 is a mobile product. In a first event, a user of the mobile product is evaluating the product and interacting with the mobile product and creates a user driven event during the interaction. The user driven event initiates a Bluetooth interaction over a Bluetooth connection in the form of a Bluetooth launcher event. The Bluetooth launcher event launches a program to supply supporting information. The launcher event may cause the initiation of a video. In some arrangements, the video may start playing on Video Display C shown in FIG. 2 automatically. In other arrangements, the launcher event may initiate a supporting information program on another computing device. For example, in FIG. 2, the computing device may be a tablet computer built in to a counter with integrated Display B. In some arrangements, the launcher event may initiate a tutorial, demonstration, or simulation on Display B of the tablet computing device. Further interaction with the electronic user device 102 or interaction with the tablet computing device may further initiate a video or other informational non-interactive display on Display C.

Figure 3:
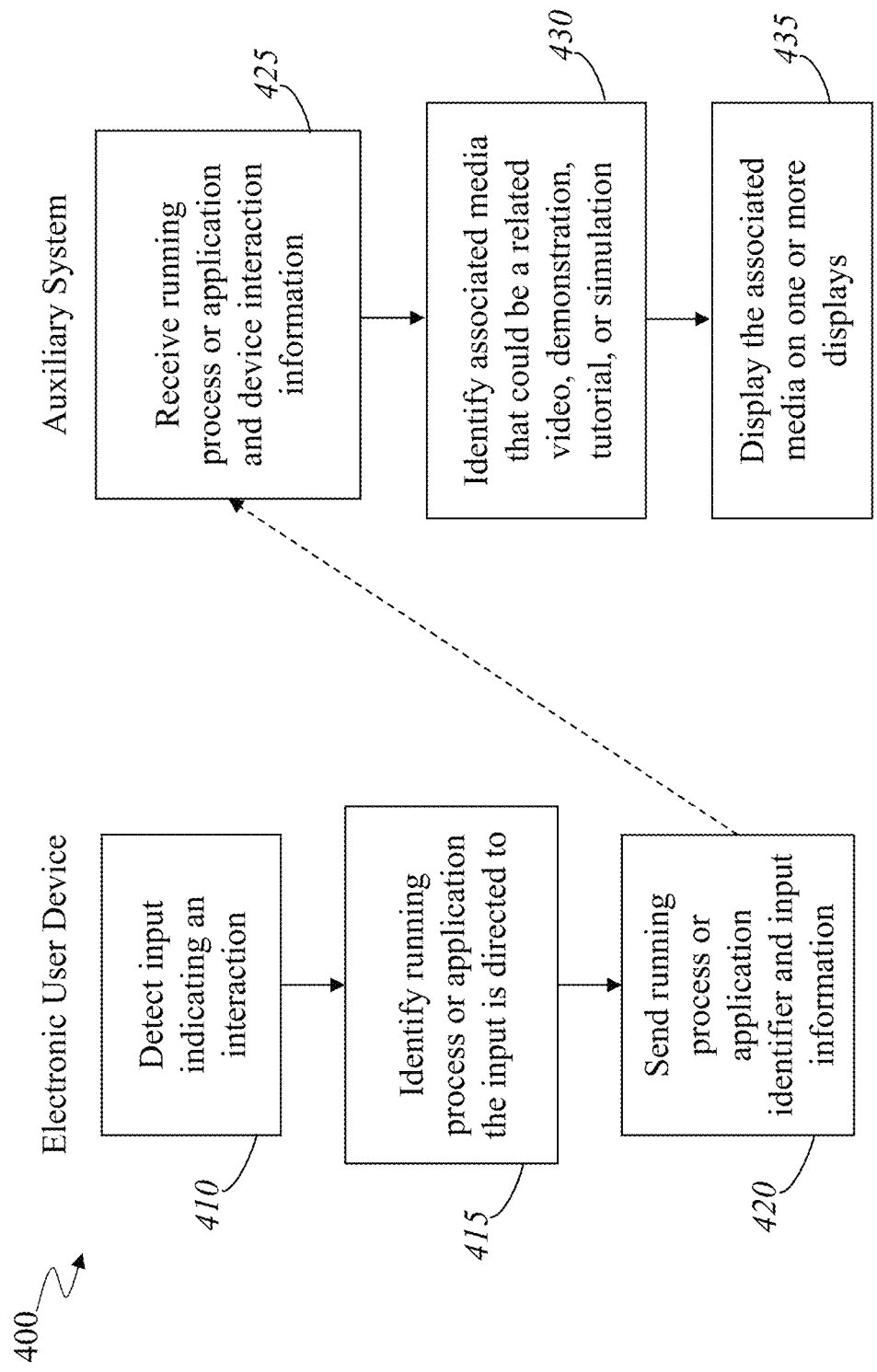
FIG. 3 is a block diagram depicting an embodiment of a method of sending information from a personal device to an auxiliary system.

Referring now to FIG. 3, a block diagram of a method 400 for providing assisted interaction with electronic user devices is depicted according to an example embodiment. The method 400 is performed by a processor 202 running instructions from a memory 204 on an electronic user device 102 and a processor 220 running instructions from a memory 230 of an auxiliary system 106. While performing the method 400, the electronic user device 102 communicates data over a network interface 206 over a network 104 to a network interface 232 of an auxiliary system 106. The method 400 begins when a service running on an electronic user device 102 detects an input to the electronic user device indicating user interaction at 410. In some arrangements, the service is a transparent overlay service 216 running on the electronic user device. The transparent overlay service 216 is not apparent to the user of the electronic user device 102 and allows the user to interact with the electronic user device 102 to try out features as well as any applications 218 installed on the electronic user device 102. The input may be received from a touchscreen integrated in the electronic user device, keyboard, keypad or other input/output mechanism allowing user interaction. An input may register from the electronic user device 102 being picked up or interacted with initially, with the initial interaction input coming from gyroscopic, biometric, or other sensors detecting movement or the presence of a user. In some arrangements, the detection of the input is obtained by a transparent overlay service 216 regularly polling one or more input devices of the electronic user device 102. In other arrangements, the transparent overlay service has access to the accessibility interface of the operating system to use to obtain additional interaction information.

The service running on the electronic user device 102 identifies either a running process or an application that the input, indicating a user interaction, is directed to at 415. In some arrangements, the service is a transparent overlay service 216 that monitors inputs and outputs to the electronic user device 102 as well as monitoring running processes and applications. Identifying the input to a running process or application may also require monitoring the response from the running process or application. An input to an application may also be an input that starts or launches the process or application.

The service sends an identifier of the running process or the application along with information about the input to an auxiliary system 106 at 420. The information is sent over the network 104. In some arrangements, the information is sent over Bluetooth where the electronic user device 102 and auxiliary system 106 have been previously paired. The information includes enough to identify the user interaction with the electronic user device and the subsequent input to the running process or application to determine the effect the input will have on the running process or application and the user experience on the electronic user device 102. For example, information may be sent over Bluetooth that an input to the touchscreen display of the electronic user device has launched a camera application installed on the electronic user device. Subsequent information sent over Bluetooth includes an input to the touchscreen display directed to the camera application that indicates the user has used the camera application to take a picture using the electronic user device 102.

In the example embodiment, as depicted in FIG. 3, an auxiliary system 106 receives information comprising the running process or application running on the user device as well as the interaction at 425. The information is received over the network 104. In some arrangements, the information is received over Bluetooth where the electronic user device 102 and auxiliary system 106 have been previously paired. The information includes an identifier that allows the auxiliary system 106 to determine the identity of the running process or application as well as sufficient information on the user interaction on the electronic user device 102 directed to the running process or application to determine the effect the input caused by the user interaction will have on the running process or application and the user experience on the electronic user device 102.

The auxiliary system 106 identifies associate media based on the running process or application as well as the device interaction information at 430. The associated media can be a related video, demonstration, tutorial, simulation, etc. In some arrangements, the associated media provides additional information to the user about the running process or application, demonstrates how to use certain features of the running process or application, provides a tutorial on the general use of the running process or application, provides a tutorial on the specific function accessed by the interaction directed to the running process or application, or provides a simulation on the functionality of the running process or application in differing scenarios. In some arrangements, the auxiliary system 106 may identify associated media by performing a contextual search of available associated media based on the nature of the running process or application, identity of the running process or application, model of the electronic user device 102, type of user interaction directed to the running process or application. In other arrangements, the auxiliary system 106 may access a database where combinations of running processes or applications along with different user interactions are mapped to associated media.

The auxiliary system 106 displays the associated media on one or more displays at 435. In some arrangements, there is one display 108 displaying the associated media. In some arrangements, there is no active interaction with the auxiliary system 106 and display 108, e.g. the associated media is a video. In other arrangements, the display 108 accepts inputs from the user. Inputs may change the displayed size of the associated media, pause the associated media, and alter the associate media to another type of associated media. Still in some other arrangements, two or more displays may be used to display the associated media. The use of two displays may be automatic or inputs from the user may enable the use of the second display. For example, the user interaction with the electronic user device 102 may cause a tutorial with instructions to display on display 108 while a demonstration video of somebody following the instructions is displayed on display 110. As another example, the user interaction with the electronic user device 102 may cause a tutorial with instructions to display on display 108. Interaction with display 108 via a touchscreen may initiate the demonstration video on display 110.

Figure 4:
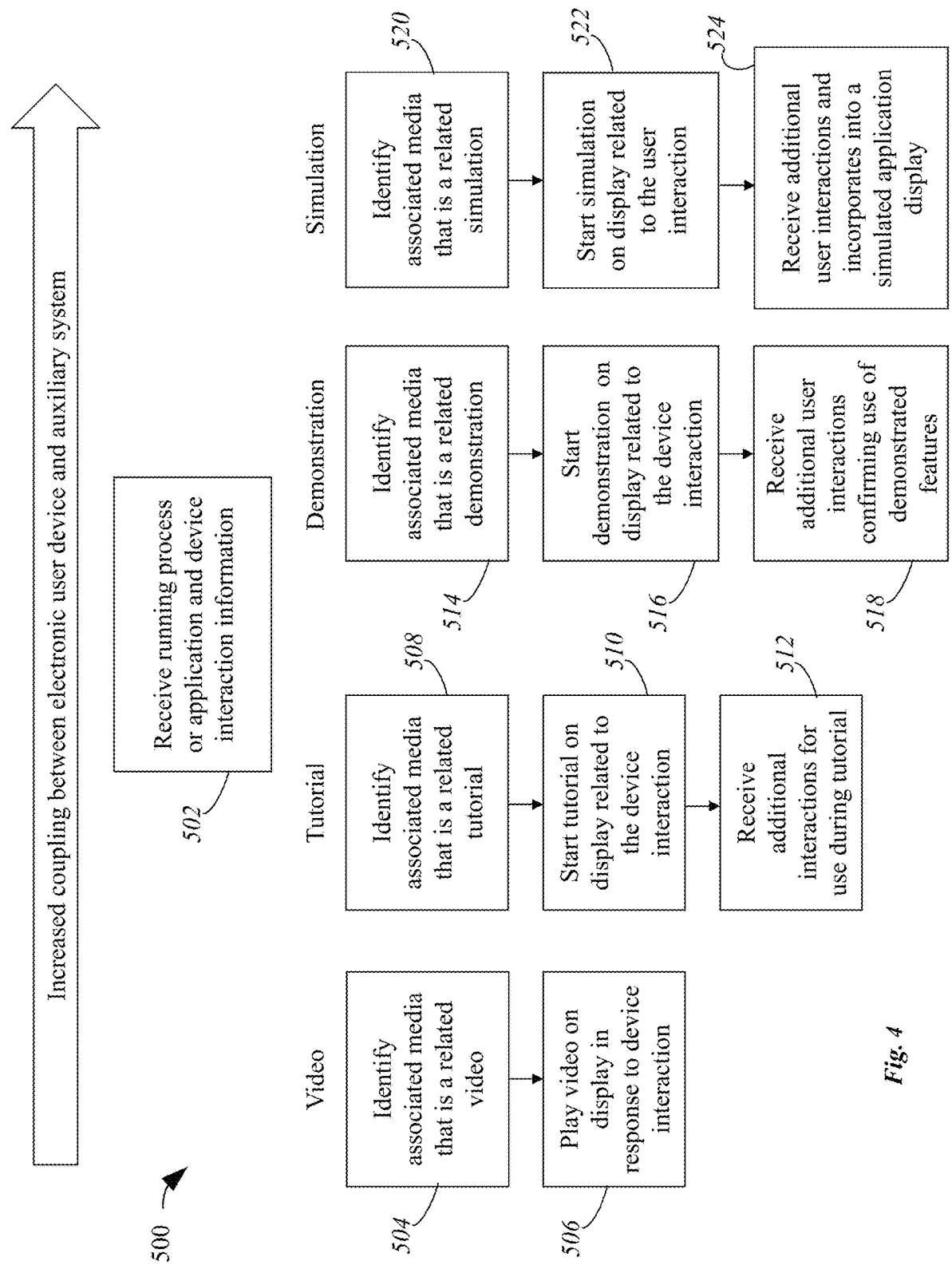
FIG. 4 is a block diagram depicting an embodiment of a method of receiving information from a personal device and initiating one of a video, tutorial, demonstration, or simulation on an auxiliary system.

Referring now to FIG. 4, a block diagram of a method 500 for receiving information from an electronic user device 102 and initiating one of a video, tutorial, demonstration, or simulation on an auxiliary system 106 is depicted according to an example embodiment. The method 500 is run on a processor 220 running instructions from a memory 230 of an auxiliary system 106. While performing the method 400, the auxiliary system 106 communicates data over a network interface 232 to a network interface 206 of an electronic user device 102 over a network 104. Generally, the depiction of the block diagram is depicted with blocks showing increased coupling between electronic user devices 102 and the auxiliary system 106 when progressing to the right. The method 500 starts when an auxiliary system 106 receives information comprising a running process or an application running on the user device as well as information of user interaction with the electronic user device 102 at 502. The information is received over the network 104. In some arrangements, the information is received over Bluetooth where the electronic user device 102 and auxiliary system 106 have been previously paired. The information includes an identifier that allows the auxiliary system 106 to determine the identity of the running process or application as well as sufficient information on the user interaction on the electronic user device 102 directed to the running process or application to determine the effect the input caused by the user interaction will have on the running process or application and the user experience on the electronic user device 102.

The auxiliary system 106 identifies an associated media with the information received and the associated media is a related video at 504. Selection of the video may be based on the running process, type of application, model of the electronic user device 102, the nature and specifics of the device interaction by the user or any combination thereof. In some arrangements, the auxiliary system 106 may identify associated media by performing a contextual search of available associated media based on the received information. In other arrangements, the auxiliary system 106 may access a database where combinations of running processes or applications along with different user interactions are mapped to associated media.

The auxiliary system 106 plays the video on one or more of a first display 108 or a second display 110 at 506. In some other arrangements, an initial video may be played upon interaction with or picking up any of the electronic user devices 102 connected to the auxiliary system 106 to play an introductory video explaining the use of the auxiliary system 106 as an assisted demonstration device. Videos may be played automatically or require user input to confirm starting the video. In some arrangements, there is no active interaction with the auxiliary system 106 and display 108, e.g. the associated media is a video. In other arrangements, the display 108 accepts inputs from the user. Inputs may change the displayed size of the associated media, pause the associated media, and alter the associate media to another type of associated media. Still in some other arrangements, two or more displays may be used to display the associated media. The use of two displays may be automatic or inputs from the user may enable the use of the second display. For example, the user interaction with the electronic user device 102 may cause a tutorial with instructions to display on display 108 while a demonstration video of somebody following the instructions is displayed on display 110. As another example, the user interaction with the electronic user device 102 may cause a tutorial with instructions to display on display 108. Interaction with display 108 via a touchscreen may initiate the demonstration video on display 110. In some arrangements, continued interaction with the electronic user device 102 stops the video if no longer relevant to the running process or application the user is interacting with.

In one example, the auxiliary system 106 receives information comprising the electronic user device 102 model as well as device information interaction information indicating that a user has picked up the electronic user device 102. The auxiliary system 106 uses mapped device model and interaction information to locate a video for the electronic user device 102 that offers information on general features of the electronic user device 102 model. The auxiliary system 106 automatically plays the video on display 108.

In another example, the auxiliary system 106 receives information comprising the electronic user device 102 model, device information interaction information, and an application identifier indicating that a user has launched a picture editing application on the electronic user device 102. The auxiliary system 106 searches for matching associated media based on the contextual elements in the information received and finds a video demonstrating features of the picture editing application. The auxiliary system 106 automatically plays the video on display 108.

In another example, the auxiliary system 106 receives information comprising the electronic user device 102 model, device information interaction information, and an application identifier. The interaction information indicates that a user is interacting with an application. Further device information interaction is received indicating that a user is having trouble with the application (e.g., length of time between interactions exceeds a threshold while the user is still holding the electronic user device 102, repetitive interactions with the application without presumed intended result indicating difficulty, repeatedly opening the same application, etc.). In some arrangements, the user device interaction service 240 is used to detect the user having trouble with an application, user interface, settings, services, or other programs running on the personal device 102. The auxiliary system 106 searches for matching associated media based on the contextual elements in the information received and the indicated difficulty and finds a video demonstrating a particular aspect of the application. The auxiliary system 106 displays a prompt on display 108 asking the user if he or she wants to play a video related to the particular aspect of the application. After receiving an input on the touchscreen embedded in display 108, the auxiliary system 106 the video on display 108. Alternately, after receiving an input on the touchscreen embedded in display 108, the auxiliary system 106 plays the video on display 110.

In another example, the auxiliary system 106 receives information comprising the device information interaction information, and an application identifier. The interaction information indicates that a user started an application but then quickly exited. The auxiliary system 106 searches for matching associated media based on the contextual elements in the information received and the indicated difficulty and finds a video demonstrating a particular aspect of the application. The auxiliary system 106 displays a prompt on display 108 asking the user if he or she wants to play a video related to the particular aspect of the application. After receiving an input on the touchscreen embedded in display 108, the auxiliary system 106 the video on display 108. Alternately, after receiving an input on the touchscreen embedded in display 108, the auxiliary system 106 plays the video on display 110.

In a further example, the auxiliary system 106 receives information comprising the electronic user device 102 model information and device information interaction information. The interaction information indicates that a user has picked up and interacted with two different electronic user devices 102 at the same time or within a threshold period of time. The auxiliary system 106 searches for matching associated media based on the contextual elements in the information received and finds a video comparing and contrasting the two different electronic user devices 102. The auxiliary system 106 automatically plays the video on display 108.

The auxiliary system 106 identifies an associated media with the information received and the associated media is a tutorial at 508. Selection of the tutorial may be based on the running process, type of application, model of the electronic user device 102, the nature and specifics of the device interaction by the user or any combination thereof. In some arrangements, the auxiliary system 106 may identify associated media by performing a contextual search of available associated media based on the received information. In other arrangements, the auxiliary system 106 may access a database where combinations of running processes or applications along with different user interactions are mapped to associated media.

The auxiliary system 106 starts the tutorial and displays the tutorial on one or more of a first display 108 or a second display 110 at 510. Tutorials may be started automatically or require user input to confirm starting the tutorial. In some arrangements, there is no active interaction with the auxiliary system 106 and display 108. In other arrangements, the display 108 accepts inputs from the user. Inputs may change the displayed size of the associated media, pause the tutorial, and alter the associate media to another type of associated media. Still in some other arrangements, two or more displays may be used to display the associated media. The use of two displays may be automatic or inputs from the user may enable the use of the second display. For example, the user interaction with the electronic user device 102 may cause a tutorial with instructions to display on display 108 while a demonstration video of somebody following the instructions is displayed on display 110. As another example, the user interaction with the electronic user device 102 may cause a tutorial with instructions to display on display 108. Interaction with display 108 via a touchscreen may initiate the demonstration video related to the tutorial on display 110. In some arrangements, continued interaction with the electronic user device 102 stops the tutorial if no longer relevant to the running process or application the user is interacting with.

The auxiliary system 106 receives information including additional interactions with the running process or application at 512. In some arrangements, additional interactions by the user with the electronic device are incorporated into the displayed tutorial. Additional interactions may advance the tutorial, cause the tutorial to emphasize certain components or instructions, change to a different tutorial, or end the tutorial if no longer relevant to the running process or application the user is interacting with.

In one example, the auxiliary system 106 receives information comprising the electronic user device 102 model as well as device information interaction information indicating that a user has picked up the electronic user device 102. The auxiliary system 106 uses mapped device model and interaction information to locate a tutorial for the electronic user device 102 that offers instructions on general use of the electronic user device 102 model. The auxiliary system 106 automatically starts the tutorial on display 108. In some arrangements, the tutorial may advance automatically. In other arrangements, the tutorial may wait for user input (e.g., on a touchscreen integrated into display 108) to advance the instructions of the tutorial.

In another example, the auxiliary system 106 receives information comprising the electronic user device 102 model, device information interaction information, and an application identifier indicating that a user has launched a music player application on the electronic user device 102. The auxiliary system 106 searches for matching associated media based on the contextual elements in the information received and finds a tutorial with instructions to use the music player application. The auxiliary system 106 automatically starts the tutorial on display 108.

In another example, the auxiliary system 106 receives information comprising the electronic user device 102 model, device information interaction information, and an application identifier. The interaction information indicates that a user is interacting with an application. Further device information interaction is received indicating that a user is having trouble with the application (e.g., length of time between interactions exceeds a threshold while the user is still holding the electronic user device 102, repetitive interactions with the application without presumed intended result indicating difficulty, repeatedly opening the same application, etc.). The auxiliary system 106 searches for matching associated media based on the contextual elements in the information received and the indicated difficulty and a tutorial demonstrating the particular aspect causing the difficulty. The auxiliary system 106 displays a prompt on display 108 asking the user if he or she wants to see a tutorial related to the particular aspect of the application. After receiving an input on the touchscreen embedded in display 108, the auxiliary system 106 launches the tutorial on display 108. Alternately, after receiving an input on the touchscreen embedded in display 108, the auxiliary system 106 launches the tutorial on display 110.

The auxiliary system 106 identifies an associated media with the information received and the associated media is a demonstration at 514. Selection of the demonstration may be based on the running process, type of application, model of the electronic user device 102, the nature and specifics of the device interaction by the user, or any combination thereof. In some arrangements, the auxiliary system 106 may identify associated media by performing a contextual search of available associated media based on the received information. In other arrangements, the auxiliary system 106 may access a database where combinations of running processes or applications along with different user interactions are mapped to associated media.

The auxiliary system 106 starts the demonstration and displays the demonstration on one or more of a first display 108 or a second display 110 at 516. Demonstrations may be started automatically or require user input to confirm starting the demonstration. In some arrangements, there is no active interaction with the auxiliary system 106 and display 108. In other arrangements, the display 108 accepts inputs from the user. In other arrangements, inputs may change the displayed size of the associated media, pause the demonstration, skip the demonstration and alter the associate media to another type of associated media. Still in some other arrangements, two or more displays may be used to display the associated media. The use of two displays may be automatic or inputs from the user may enable the use of the second display. For example, the user interaction with the electronic user device 102 may cause a demonstration display on display 108 while a related video is displayed on display 110. As another example, the demonstration may display on display 108 while text instructions are displayed on display 110. Interaction with display 108 via a touchscreen may initiate a different video related to the demonstration on display 110. In some arrangements, continued interaction with the electronic user device 102 stops the demonstration if no longer relevant to the running process or application the user is interacting with. In some arrangements, the demonstration displays the next step or sequence of steps the user should perform on the electronic user device 102.

The auxiliary system 106 receives information including additional interactions with the running process or application at 518. In some arrangements, additional interactions by the user with the electronic device are incorporated into the displayed demonstration. For example, an interaction with the electronic user device 102 is demonstrated as part of the displayed demonstration. Once the interaction is subsequently actually done by the user as an input to the electronic user device 102, the displayed demonstration advances to the next element of the demonstration. Further, additional interactions may advance the demonstration, cause the demonstration to emphasize certain components or features, change to a different demonstration, or end the demonstration if no longer relevant to the running process or application the user is interacting with.

In one example, the auxiliary system 106 receives information comprising the electronic user device 102 model, device information interaction information, and an application identifier indicating that a user has launched an application on the electronic user device 102. The auxiliary system 106 searches for matching associated media based on the contextual elements in the information received and finds a demonstration of the application. The auxiliary system 106 automatically starts the demonstration on display 108. As additional device information interaction information is received, the auxiliary system advances the demonstration if the received interaction information matches what was demonstrated on display 108 as part of the demonstration. This provides feedback to the user that they are following the demonstration correctly. Alternately, the demonstration may not start automatically and instead the auxiliary system 106 displays a prompt on display 108.

In one example, the auxiliary system 106 receives information comprising the electronic user device 102 model, device information interaction information, and an application identifier indicating that a user has launched an application on the electronic user device 102. The auxiliary system 106 searches for matching associated media based on the contextual elements in the information received and finds a demonstration of the application. The auxiliary system 106 automatically starts the demonstration on display 108. As additional device information interaction information is received, the auxiliary system advances the demonstration if the received interaction information matches what was demonstrated on display 108 as part of the demonstration. This provides feedback to the user that they are following the demonstration correctly. Alternately, the demonstration may not start automatically and instead the auxiliary system 106 displays a prompt on display 108.

The auxiliary system 106 identifies an associated media with the information received and the associated media is a related simulation at 520. Selection of the simulation may be based on the running process, type of application, model of the electronic user device 102, the nature and specifics of the device interaction by the user or any combination thereof. For example, a simulation may be chosen for an application that interacts with the environment to simulate environments other than the location of the auxiliary system 106. In some arrangements, the auxiliary system 106 may identify associated simulations by performing a contextual search of available associated media based on the received information. In other arrangements, the auxiliary system 106 may access a database where combinations of running processes or applications along with different user interactions are mapped to associated media.

The auxiliary system 106 starts the simulation and displays the simulation one or more of a first display 108 or a second display 110 at 522. A simulation may allow the user to experience an application outside the current environment at the location of the auxiliary system. In some arrangements, there is no active interaction with the auxiliary system 106 and display 108. In other arrangements, the display 108 accepts inputs from the user. In other arrangements, inputs may change the displayed size of the associated media, pause the simulation, alter parameters of the simulation, and alter the associate media to another type of associated media. Still in some other arrangements, two or more displays may be used to display simulation. The use of two displays may be automatic or inputs from the user may enable the use of the second display. For example, the user interaction with the electronic user device 102 may cause a simulation to display on display 108 while a related video, displayed instructions, or a demonstration is displayed on display 110. As another example, the simulation may display on display 108 while additional textual information is displayed on display 110. Interaction with display 108 via a touchscreen may initiate a different video related to the simulation on display 110. In some arrangements, continued interaction with the electronic user device 102 stops the demonstration if no longer relevant to the running process or application the user is interacting with. In some arrangements, the demonstration displays the next step or sequence of steps the user should perform on the electronic user device 102.

The auxiliary system 106 receives information including additional interactions with the running process or application at 524. In some arrangements, additional interactions are used to change the displayed output of the simulation. For example, an interaction with the electronic user device 102 is simulated in the output of the display as if the interaction was with the simulated process or application. Exiting the process or application may cause the simulation to also end.

In one example, the auxiliary system 106 receives information comprising the electronic user device 102 model, device information interaction information, and an application identifier indicating that a user has launched an application on the electronic user device 102 where the application is a navigation application utilizing GPS. The auxiliary system 106 searches for matching associated media based on the contextual elements in the information received and finds a simulation of the application. The auxiliary system 106 automatically starts the simulation on display 108 or prompts the user to start and a representation of the navigation simulation is displayed. The auxiliary system 106 receives additional device information interaction information as the user enters a destination in to the navigation application. The auxiliary system 106 simulates the navigation application as if the user is in motion proceeding to the destination entered in to the navigation application. As further device interaction information is received concerning various settings and options in the navigation application, the display of the simulation on display 108 is changed to show the effect of the changes in settings and options.

In another example, the auxiliary system 106 receives information comprising the electronic user device 102 model, device information interaction information, and an application identifier indicating that a user has launched an application on the electronic user device 102 where the application is a panoramic camera application. The auxiliary system 106 uses a mapped device model and interaction information to locate a simulation for the electronic user device 102 that simulates the panoramic camera application. The auxiliary system 106 automatically starts the simulation on display 108 or prompts the user to start and a representation of the navigation simulation is displayed. The auxiliary system 106 displays a variety of simulated environments as options to use during the simulation of the panoramic camera application. The user chooses an environment or location given as one of the choices, (e.g., monument valley). The auxiliary system 106 receives additional device information interaction information comprising gyroscopic motion information as the user moves the electronic user device 102 and the auxiliary system 106 uses the interaction information to mimic the motion and simulate the view from the selected environment. As further device interaction information is received concerning various settings and options in the panoramic camera application, the display of the simulation on display 108 is changed to show the effect of the changes in settings and options.

C. Network and Computing Environment

Figure 5:
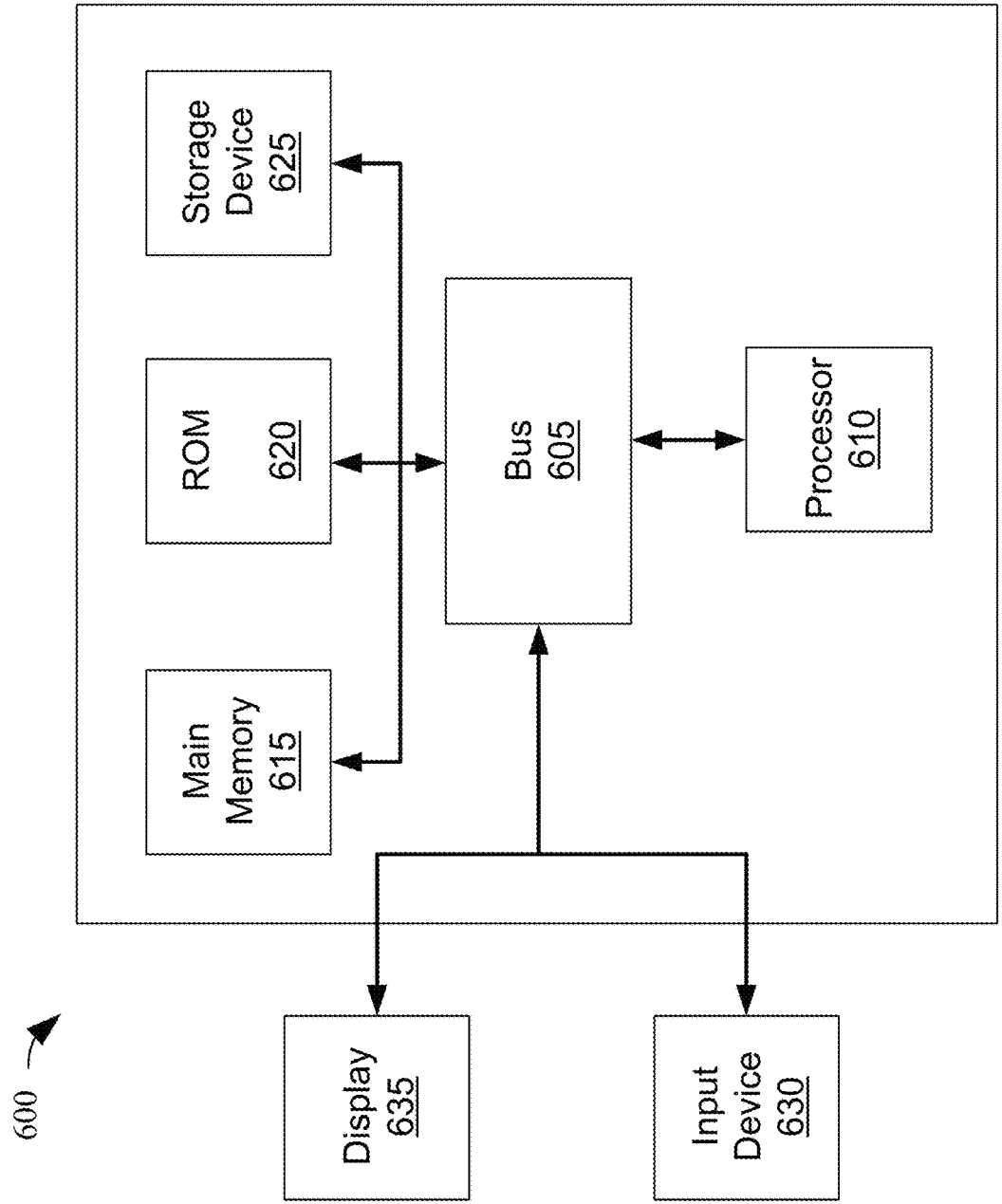
FIG. 5 is a block diagram depicting a general architecture for a computer system that may be employed to implement various elements of the systems and methods described and illustrated herein.

FIG. 5 is a block diagram of a computer system 600 that can be used to implement the user electronic device 102, the auxiliary system 106, and/or any other computing device described herein. The computing system 600 includes a bus 605 or other communication component for communicating information and a processor 610 or processing module coupled to the bus 605 for processing information. The computing system 600 also includes a main memory 615, such as a RAM or other dynamic storage device, coupled to the bus 605 for storing information, and instructions to be executed by the processor 610. The main memory 615 can also be used for storing position information, temporary variables, or other intermediate information during execution of instructions by the processor 610. The computing system 600 may further include a ROM 620 or other static storage device coupled to the bus 605 for storing static information and instructions for the processor 610. A storage device 625, such as a solid state device, magnetic disk or optical disk, is coupled to the bus 605 for persistently storing information and instructions. The computing device 600 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 600 may be coupled via the bus 605 to a display 635, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 630, such as a keyboard including alphanumeric and other keys, may be coupled to the bus 605 for communicating information and command selections to the processor 610. In another implementation, the input device 630 may be integrated with the display 635, such as in a touch screen display. The input device 630 can include a cursor control, such as a mouse, a trackball, or cursor direction keys, for communicating direction information and command selections to the processor 610 and for controlling cursor movement on the display 635.

According to various implementations, the processes and/or methods described herein can be implemented by the computing system 600 in response to the processor 610 executing an arrangement of instructions contained in the main memory 615. Such instructions can be read into the main memory 615 from another computer-readable medium, such as the storage device 625. Execution of the arrangement of instructions contained in the main memory 615 causes the computing system 600 to perform the illustrative processes and/or method steps described herein. One or more processors in a multi-processing arrangement may also be employed to execute the instructions contained in the main memory 615. In alternative implementations, hard-wired circuitry may be used in place of or in combination with software instructions to effect illustrative implementations. Thus, implementations are not limited to any specific combination of hardware circuitry and software.

The computing system 600 also includes a communications module 640 that may be coupled to the bus 605 for providing a communication link between the system 600 and the network 104. As such, the communications module 640 enables the processor 610 to communicate, wired or wirelessly, with other electronic systems coupled to the network 104. For instance, the communications module 640 may be coupled to an Ethernet line that connects the system 600 to the Internet or another network 104. In other implementations, the communications module 640 may be coupled to an antenna (not shown) and provides functionality to transmit and receive information over a wireless communication interface with the network 104.

In various implementations, the communications module 640 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications module 640 may include one or more transceivers configured to communicate using different types of protocols, communication ranges, operating power requirements, RF sub-bands, information types (e.g., voice or data), use scenarios, applications, and/or the like. In various implementations, the communications module 640 may comprise one or more transceivers configured to support communication with local devices using any number or combination of communication standards.

In various implementations, the communications module 640 can also exchange voice and data signals with devices using any number or combination of communication standards (e.g., GSM, CDMA, TDMA, WCDMA, OFDM, GPRS, EV-DO, WiFi, WiMAX, S02.xx, UWB, LTE, satellite, etc). The techniques described herein can be used for various wireless communication networks 150 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an example computing system 600 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a non-transitory tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing module" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular embodiments. Certain features described in this specification in the context of separate embodiments can also be implemented in combination in a single implementation. Conversely, various features described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method running on one or more processors of a user device comprising:

executing, by the one or more processors, a service in a background of the user device to monitor activities and tasks running on the user device, the service configured to monitor the activities and tasks running on the user device by monitoring one or more input/output devices of the user device or an accessibility interface of the user device;

detecting, by the service via the one or more input/output devices of the user device or the accessibility interface of the user device, a plurality of interactions with the user device directed to an application installed on the user device to perform an operation associated with the application installed on the user device;

detecting, by the service, an interactive event indicative of a difficulty in interacting with the application based on at least one of (i) a repetitive interaction pattern associated with the plurality of interactions satisfying a predetermined pattern or (ii) one or more time durations between consecutive interactions of the plurality of interactions exceeding a threshold time value;

identifying, by the service, the application installed on the user device to which the plurality of interactions are directed based on the plurality of interactions; and sending, by the user device over a network, to an auxiliary display device different than and communicatively coupled to the user device, data comprising an indicator of a model of the user device, an identifier of the application, and information related to the interactive event, wherein sending the data initiates at least one of a video playback, a tutorial, a demonstration, or a simulation related to one or more features of the application associated with the interactive event, based on the data sent by the user device to the auxiliary display device.

2. The method of claim 1 further comprising:

detecting, by the service via the one or more input/output devices of the user device or the accessibility interface of the user device, a second interaction with the application installed on the user device; and sending, to the auxiliary display device, second data over the network comprising the identifier of the application and an indication of the second interaction.

3. The method of claim 2, wherein sending the data initiates a tutorial and sending the second data alters a presentation of the tutorial.

4. The method of claim 2, wherein sending the data initiates a simulation and sending the second data alters a presentation of the simulation.

5. The method of claim 1, wherein the data is sent over the network using one of Bluetooth or near-field-communication.

6. The method of claim 1, wherein sending the data initiates a demonstration, and wherein the method further comprises sending second data to the auxiliary device, wherein the second data comprises an indication of a second interaction with the application that mirrors the presentation of a demonstrate interaction on a display of the auxiliary device.

7. A system comprising:

an auxiliary display device comprising:

one or more processors; and a display; and a transparent overlay service running on a user device that is different than and communicatively coupled to the auxiliary display device, the transparent overlay service is configured to:

monitor activities and tasks running on the user device by monitoring one or more input/output devices of the user device or an accessibility interface of the user device;

detect, via the one or more input/output devices of the user device or the accessibility interface of the user device, a plurality of interactions with the user device directed to an application installed on the user device to perform an operation associated with the application installed on the user device;

detect an interactive event indicative of a difficulty in interacting with the application based on at least one of (i) a repetitive interaction pattern associated with the plurality of interactions satisfying a predetermined pattern or (ii) one or more time durations between consecutive interactions of the plurality of interactions exceeding a threshold time value;

identify the application installed on the user device to which the plurality of interactions are directed to based on the plurality of interactions; and send, over a network connection, to the auxiliary display device, data comprising an indicator of a model of the user device, an identifier of the application, and information related to interactive event, receiving the data, by the auxiliary display device, over the network connection causes the one or more processors to initiate one of a video playback, a tutorial, a demonstration, or a simulation related to one or more features of the application associated with the interactive event, based on the data sent by the transparent overlay service to the auxiliary display device.

8. The system claim 7, wherein the transparent overlay service is further configured to:

detect, via the one or more input/output devices of the user device or the accessibility interface of the user device, a second interaction directed to the application;

send, over the network connection, to the auxiliary display device, second data comprising the identifier of the application and, an indication of the second interaction, receiving the second data over the network connection causes the one or more processors to alter the display of the one of a video playback, a tutorial, a demonstration, or a simulation.

9. The system of claim 7, wherein the data is sent over the network connection using one of Bluetooth or near-field-communication.

10. The system of claim 7, wherein, receiving the data over the network connection causes the one or more processors to initiate the video playback.

11. The system of claim 7, wherein, receiving the data over the network connection causes the one or more processors to initiate the simulation.

12. The system of claim 7, wherein, receiving the data over the network connection causes the one or more processors to initiate the tutorial.

13. One or more non-transitory computer-readable storage media storing instructions that are executable by one or more processing devices to perform operations comprising:

executing a service in a background of a user device to monitor activities and tasks running on the user device, the service monitors the activities and tasks running on the user device by monitoring one or more input/output devices of the user device or an accessibility interface of the user device;

detecting, by the service via the one or more input/output devices of the user device or the accessibility interface of the user device, a plurality of interactions with the user device directed to an application installed on the user device to perform an operation associated with the application installed on the user device;

detecting, by the service, an interactive event indicative of a difficulty in interacting with the application based on at least one of (i) a repetitive interaction pattern associated with the plurality of interactions satisfying a predetermined pattern or (ii) one or more time durations between consecutive interactions of the plurality of interactions exceeding a threshold time value;

identifying an application installed on the user device to which the plurality of interactions are directed to based on the plurality of interactions; and sending, over a network, to an auxiliary display device different than and communicatively coupled to the user device, data comprising an indicator of a model of the user device, an identifier of the application, and information related to the interactive event;

responsive to receiving the data by the auxiliary display device, initiating by the auxiliary display device one of a video playback, a tutorial, a demonstration, or a simulation related to one or more features of the application associated with the interactive event, based on the data.

14. The one or more non-transitory computer-readable storage media of claim 13, wherein the operations further comprise:

detecting, by the service via the one or more input/output devices of the user device or the accessibility interface of the user device, a second interaction with the application installed on the user device; and sending, to the auxiliary display device, second data over the network comprising the identifier of the application and an indication of the second interaction.

15. The one or more non-transitory computer-readable storage media of claim 13, wherein the data is sent over the network using one of Bluetooth or near-field-communication.

16. The one or more non-transitory computer-readable storage media of claim 14, wherein sending the data initiates a tutorial and sending the second data alters a presentation of the tutorial.

17. The one or more non-transitory computer-readable storage media of claim 14, wherein sending the data initiates a simulation and sending the second data alters a presentation of the simulation.

18. The one or more non-transitory computer-readable storage media of claim 13, wherein sending the data initiates a demonstration, and wherein the method further comprises sending second data to the auxiliary device, wherein the second data comprises an indication of a second interaction with the application that mirrors the presentation of a demonstrate interaction on a display of the auxiliary device.

* * * * *